June 7, 1932 — D. ELDER — 1,862,180
REVOLVING SPRAYER
Filed Dec. 28, 1929
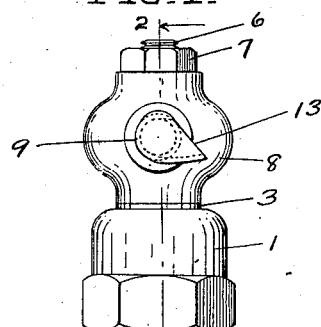
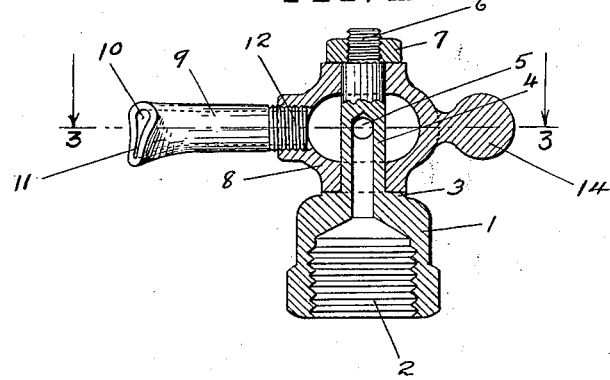
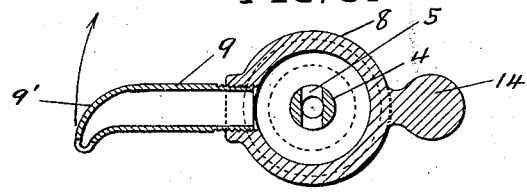
INVENTOR.
DONALD ELDER
BY
ATTORNEYS.

Patented June 7, 1932

1,862,180

UNITED STATES PATENT OFFICE

DONALD ELDER, OF BERKELEY, CALIFORNIA

REVOLVING SPRAYER

Application filed December 28, 1929. Serial No. 417,089.

This invention relates to sprinkling devices as used for watering lawns and gardens and has for its object the provision of a simple durable high speed revolving sprayer of the reactance type which will water a large area evenly and which may be adjusted for best effect on near and far watering with various water pressures.

In the drawing hereto annexed Fig. 1 is a front view of my improved revolving sprayer.

Fig. 2 is a vertical section as seen from the line 2—2 of Fig. 1, and Fig. 3 is a cross section as seen from the line 3—3 of Fig. 2.

In detail the sprayer comprises a base or standard 1 tapped at 2 for a hose connection or pipe delivering the water. This standard has a flat shoulder at 3 from which rises a round tubular stem 4 provided with a transverse passage at 5 and with the portion of the stem above this point solid and threaded at its outer end at 6 to receive a nut 7 which is brought to a definite position against a slight shoulder at the lower end of the thread.

Revolvably mounted on the stem 4 is a hollow body 8 with an enlarged chamber around the stem from one side of which projects a pipe 9 curved at its outer end at 9' and flattened or pinched to form a special V-shaped opening having a substantially round and relatively large portion 10 at its upper end and terminating in a slot-like portion 11 at its lower end. This pipe 9 is threaded to the body at 12 in a relatively tight fit so that the pipe may be revolved to adjust the inclination of its lower and upper walls and angle of its outer end 13 shown best in Fig. 1, to thereby guide the issuing stream more or less upwardly.

The shape of the pipe opening is one of the features of my invention which was developed after long experiment in trying to devise a shape which would sprinkle the same amount of water at every part of the area being watered. The upper enlarged portion 10 throws a stream unbroken on its upper surface to the greatest distance, while the reduced slot-like portion 11 emits such a small amount of water that its energy is soon spent and it falls relatively close to the sprinkler.

To sprinkle the greatest possible area the pipe is turned upon its thread so as to elevate the trajectory of the stream from enlarged portion 10 to the greatest carrying angle, though with a lower angle the device will deliver more water on a smaller area in a given time.

I use but one ejection pipe so as to concentrate all the water pressure against the one orifice and thus obtain greatly increased carrying power to sprinkle a larger area, and since the device revolves at a very high speed by reaction of the issuing water, I provide a counter-weight 14 on the body at a point diametrically opposite the pipe 9 which overcomes vibration and greatly increases the life of the device in evening up the wear on its bearing surfaces.

I claim:

A revolving sprayer comprising a tubular vertically disposed standard, a hollow body revolvably mounted on the standard, a pipe nozzle extending out of one side of the body curved at its outer end to throw a reaction jet and provided with a vertically arranged elongated orifice formed relatively large on top and restricted into a narrow slot at its lower end, and the outer end of the pipe beveled off at an angle with its trailing edge lowermost.

DONALD ELDER.